(12) United States Patent
Wang et al.

(10) Patent No.: US 11,250,395 B2
(45) Date of Patent: Feb. 15, 2022

(54) BLOCKCHAIN-BASED TRANSACTION PROCESSING METHODS AND APPARATUSES AND ELECTRONIC DEVICES

(71) Applicant: Advanced New Technologies Co., Ltd., George Town (KY)

(72) Inventors: Jiyuan Wang, Hangzhou (CN); Xuebing Yan, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/161,642

(22) Filed: Jan. 28, 2021

(65) Prior Publication Data

US 2021/0158310 A1  May 27, 2021

Related U.S. Application Data

(63) Continuation of application No. PCT/CN2019/103657, filed on Aug. 30, 2019.

(30) Foreign Application Priority Data

Oct. 25, 2018 (CN) .......................... 201811253448.9

(51) Int. Cl.
*G06Q 20/06* (2012.01)
*G06Q 20/38* (2012.01)
(Continued)

(52) U.S. Cl.
CPC ....... *G06Q 20/0658* (2013.01); *G06Q 20/382* (2013.01); *G06Q 20/4014* (2013.01);
(Continued)

(58) Field of Classification Search
None
See application file for complete search history.

(56) References Cited

U.S. PATENT DOCUMENTS 4,725,834 A * 2/1988 Chang ................. H04L 12/1868
370/451
8,615,651 B1   12/2013 Modadugu et al.
(Continued)

FOREIGN PATENT DOCUMENTS

CN    106815722    6/2017
CN    107103054    8/2017
(Continued)

OTHER PUBLICATIONS

Andreas M. Antonopoulos, Mastering Bitcoin, Dec. 2014 (Year: 2014).*
(Continued)

*Primary Examiner* — Jacob C. Coppola
*Assistant Examiner* — Timothy Paul Sax
(74) *Attorney, Agent, or Firm* — Fish & Richardson P.C.

(57) ABSTRACT

Embodiments of the present specification provide example blockchain-based data processing methods, mediums, and systems. One example method includes obtaining an available Nonce record for a target transaction from a Nonce list. The Nonce list comprises Nonce records, and each Nonce record comprises a version identifier of the Nonce list and a Nonce value. The available Nonce record to the target transaction is added. The target transaction in a blockchain is published. Prompt information indicating that the target transaction is an invalid transaction is received when a version identifier in the available Nonce record does not match the version identifier of the Nonce list; or a notification message indicating that the target transaction is processed is received when the version identifier in the available Nonce record matches the version identifier of the Nonce list and a replay attack detection is successfully performed by matching the available Nonce record with a Nonce record in the Nonce list.

16 Claims, 6 Drawing Sheets

(51) Int. Cl.
*G06Q 20/40* (2012.01)
*H04L 9/06* (2006.01)
*H04L 9/32* (2006.01)

(52) U.S. Cl.
CPC .......... *H04L 9/0637* (2013.01); *H04L 9/3257* (2013.01); *H04L 2209/38* (2013.01); *H04L 2209/56* (2013.01)

(56) References Cited

U.S. PATENT DOCUMENTS

| | | | | |
|---|---|---|---|---|
| 2005/0239440 | A1* | 10/2005 | Chen | H04L 63/0853 455/411 |
| 2006/0072678 | A1* | 4/2006 | Hadad | H04L 5/06 375/260 |
| 2007/0101412 | A1* | 5/2007 | Yang | H04L 9/3271 726/5 |
| 2015/0249647 | A1* | 9/2015 | Mityagin | G06F 16/176 713/168 |
| 2017/0149819 | A1 | 5/2017 | Androulaki et al. | |
| 2017/0212781 | A1 | 7/2017 | Dillenberger et al. | |
| 2018/0293556 | A1 | 10/2018 | Hyun et al. | |
| 2021/0083871 | A1* | 3/2021 | Smirnov | H04L 9/0894 |

FOREIGN PATENT DOCUMENTS

| | | |
|---|---|---|
| CN | 107347009 | 11/2017 |
| CN | 108023883 | 5/2018 |
| CN | 108053211 | 5/2018 |
| CN | 108389129 | 8/2018 |
| CN | 108416675 | 8/2018 |
| CN | 110084604 | 8/2019 |
| TW | 201800999 | 1/2018 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

PCT International Search Report and Written Opinion in International Application No. PCT/CN2019/103657, dated Nov. 28, 2019, 10 pages (with partial translation).

Barnes et al., "Automatic Certificate Management Environment (ACME); draft-ietf-acme-acme-16," Internet-Draft: ACME Working Group, Internet Engineering Task Force, IETF; StandardWorkingDraft, Internet Society (ISOC) 4, Rue Des Falaises CH—1205, Geneva, Switzerlan, No. 16, Oct. 12, 2018, pp. 1-90, XP015128956.

European Extended Search Report in European Application No. 19874821.2, dated Jun. 29, 2021, 14 pages.

PCT International Preliminary Report on Patentability in International Application No. PCT/CN2019/103657, dated Apr. 27, 2021, 12 pages (with English translation).

* cited by examiner

| Version identifier | Index identifier | Nonce value | Available |
|---|---|---|---|
| XXX | XXX | XXX | T |
| XXX | XXX | XXX | T |
| XXX | XXX | XXX | F |
| XXX | XXX | XXX | F |

BLOCKCHAIN-BASED TRANSACTION PROCESSING METHODS AND APPARATUSES AND ELECTRONIC DEVICES

CROSS-REFERENCE TO RELATED APPLICATIONS

This application is a continuation of PCT Application No. PCT/CN2019/103657, filed on Aug. 30, 2019, which claims priority to Chinese Patent Application No. 201811253448.9, filed on Oct. 25, 2018, and each application is hereby incorporated by reference in its entirety.

TECHNICAL FIELD

One or more embodiments of the present specification relate to the field of blockchain technologies, and in particular, to blockchain-based transaction processing methods and apparatuses and electronic devices.

BACKGROUND

A blockchain technology, also referred to as a distributed ledger technology, is an emerging technology in which several computing devices jointly participate in "bookkeeping" to maintain a complete distributed database. The blockchain technology features decentralization and transparency, each computing device can record data in the database, and the data can be synchronized rapidly between the computing devices. Therefore, the blockchain technology has been widely applied to many fields to build a decentralized system and to incorporate various execution programs into a distributed blockchain database for automatic execution.

SUMMARY

Based on the previous background, the present specification provides a blockchain-based data processing method, including: obtaining, from a Nonce list, an available Nonce record for a target transaction initiated by a user through a user account, wherein the Nonce list comprises a plurality of Nonce records, and each Nonce record of the plurality of Nonce records comprises a version identifier of the Nonce list and a Nonce value; adding the available Nonce record to the target transaction; publishing the target transaction in a blockchain; receiving, from a node device in the blockchain, prompt information indicating that the target transaction is an invalid transaction when the node device determines that a version identifier in the available Nonce record does not match the version identifier of the Nonce list maintained in the blockchain; and receiving, from the node device in the blockchain, a notification message indicating that the target transaction is processed when the node device determines that the version identifier in the available Nonce record matches the version identifier of the Nonce list maintained in the blockchain and successfully performs a replay attack detection by matching the available Nonce record with at least one of the plurality of Nonce records in the Nonce list.

In another illustrated implementation, the method further includes: in response to an initialization instruction for a client device, obtaining the Nonce list maintained in the blockchain, and locally maintaining the Nonce list on the client device before obtaining the available Nonce record for the target transaction initiated by the user through the user account from the Nonce list.

In another illustrated implementation, obtaining the available Nonce record for the target transaction initiated by the user through the user account from the Nonce list comprises obtaining the available Nonce record for the target transaction initiated by the user through the user account from the Nonce list locally maintained on the client device.

In another illustrated implementation, the plurality of Nonce records in the Nonce list locally maintained on the client device is marked as available by default; and the method further comprises marking the available Nonce record as unavailable in the Nonce list after obtaining the available Nonce record for the target transaction from the Nonce list locally maintained on the client device.

In another illustrated implementation, the method further includes: determining whether the notification message indicating that the target transaction is processed is received; and in response to determining the notification message indicating that the target transaction is received, monotonically increasing a Nonce value in the available Nonce record based on a predetermined amplitude, and re-marking the available Nonce record as available in the Nonce list after monotonically increasing the Nonce value in the available Nonce record.

In another illustrated implementation, a quantity of the plurality of Nonce records in the Nonce list indicates a transaction concurrency capability of the user account.

In another illustrated implementation, each Nonce record of the plurality the Nonce records further comprises an index identifier of the Nonce record.

Furthermore, the present specification provides a blockchain-based data processing method, including: receiving, from a client device, a target transaction that is initiated by a user through a user account and to which an available Nonce record has been added, wherein the available Nonce record has been obtained from a Nonce list that corresponds to the user account, and wherein the Nonce list is maintained in a blockchain and comprises a plurality of Nonce records; determining whether a version identifier in the available Nonce record matches a version identifier of the Nonce list; returning, to the client device, prompt information indicating that the target transaction is an invalid transaction when the version identifier in the available Nonce record is determined to not match the version identifier of the Nonce list; and matching the available Nonce record with at least one Nonce record in the Nonce list to perform a replay attack detection for the target transaction and processing the target transaction when the replay attack detection for the target transaction succeeds when the version identifier in the available Nonce record matches the version identifier of the Nonce list.

In another illustrated implementation, matching the available Nonce record with the at least one Nonce record in the Nonce list to perform the replay attack detection for the target transaction comprises matching the available Nonce record with at least one Nonce record in the Nonce list that corresponds to the user account and is maintained in the blockchain; and when the available Nonce record matches the at least one Nonce record in the Nonce list, determining that the replay attack detection for the target transaction succeeds.

In another illustrated implementation, the method further comprises when the available Nonce record matches the at least one target Nonce record in the Nonce list, monotonically increasing a Nonce value in the at least one target Nonce record based on a predetermined amplitude; and returning a notification message indicating that the target transaction is processed.

In another illustrated implementation, each Nonce record of the plurality of Nonce records comprises the version identifier of the Nonce list, a Nonce value, and an index identifier of the Nonce record.

Correspondingly, the present specification further provides a blockchain-based transaction processing apparatus, applied to a client device, where a Nonce list corresponding to a user account is maintained in a blockchain, the Nonce list includes a plurality of Nonce records, the Nonce record includes a version identifier of the Nonce list and a Nonce value, and the apparatus includes: an acquisition module, configured to obtain an available Nonce record for a target transaction initiated by a user through the user account from the Nonce list; an addition module, configured to add the obtained available Nonce record to the target transaction; and a publication module, configured to publish the target transaction in the blockchain, so that when determining that a version identifier in the available Nonce record does not match the version identifier of the Nonce list maintained in the blockchain, a node device in the blockchain returns prompt information indicating that the target transaction is an invalid transaction to the client device; or when determining that a version identifier in the available Nonce record matches the version identifier of the Nonce list maintained in the blockchain, the node device in the blockchain further matches the available Nonce record with the Nonce record in the Nonce list to perform replay attack detection for the target transaction, and processes the target transaction when the replay attack detection for the target transaction succeeds.

In another illustrated implementation, the acquisition module is further configured to: before obtaining the available Nonce record for the target transaction initiated by the user through the user account from the Nonce list, in response to an initialization instruction for the client device, obtain the Nonce list maintained in the blockchain, and locally maintain the obtained Nonce list on the client device.

In another illustrated implementation, the acquisition module is configured to obtain the available Nonce record for the target transaction initiated by the user through the user account from the Nonce list locally maintained on the client device.

In another illustrated implementation, the plurality of Nonce records in the Nonce list locally maintained on the client device is marked as available by default; and the acquisition module is further configured to mark the available Nonce record as unavailable in the Nonce list after obtaining the available Nonce record for the target transaction from the Nonce list locally maintained on the client device.

In another illustrated implementation, the acquisition module is further configured to determine whether a notification message indicating that the target transaction is processed is received from the node device; and if yes, monotonically increase a Nonce value in the available Nonce record based on predetermined amplitude, and re-mark the available Nonce record as available in the Nonce list after monotonically increasing the Nonce value.

In another illustrated implementation, the client device is a multi-threaded client device, and a quantity of Nonce records in the Nonce list indicates a transaction concurrency capability of the user account.

In another illustrated implementation, the Nonce record further includes an index identifier of the Nonce record.

Correspondingly, the present specification further provides a blockchain-based transaction processing apparatus, applied to a node device in a blockchain, where a Nonce list set is maintained in the blockchain, the Nonce list set includes Nonce lists corresponding to several user accounts, the Nonce list includes a plurality of Nonce records, the Nonce record includes a version identifier of the Nonce list and a Nonce value, and the apparatus includes: a receiving module, configured to receive a target transaction that is initiated by a user through a user account and sent by a client device, where an available Nonce record obtained from a Nonce list that corresponds to the user account and is maintained in the blockchain is added to the target transaction; a determining module, configured to determine whether a version identifier in the available Nonce record matches a version identifier of the Nonce list that corresponds to the user account and is maintained in the blockchain; and a return module, configured to: if the version identifier in the available Nonce record does not match the version identifier of the Nonce list that corresponds to the user account and is maintained in the blockchain, return prompt information indicating that the target transaction is an invalid transaction to the client device; or a detection module, configured to: if the version identifier in the available Nonce record matches the version identifier of the Nonce list that corresponds to the user account and is maintained in the blockchain, further match the available Nonce record with a Nonce record in the Nonce list to perform replay attack detection for the target transaction, and process the target transaction when the replay attack detection for the target transaction succeeds.

In another illustrated implementation, the detection module is further configured to match the available Nonce record with the Nonce record in the Nonce list that corresponds to the user account and is maintained in the blockchain; and if the available Nonce record matches any target Nonce record in the Nonce list, determine that the replay attack detection for the target transaction succeeds.

In another illustrated implementation, the detection module is further configured to if the available Nonce record matches the any target Nonce record in the Nonce list, monotonically increase a Nonce value in the target Nonce record based on predetermined amplitude; and return a notification message indicating that the target transaction is processed to the client device.

In another illustrated implementation, the Nonce record further includes an index identifier of the Nonce record.

Correspondingly, the present specification further provides an electronic device, including: a processor; and a memory, configured to store a machine executable instruction, where by reading and executing the machine-executable instruction that is stored in the memory and corresponds to blockchain-based transaction processing control logic, the processor is promoted to perform the following operations: obtaining an available Nonce record for a target transaction initiated by a user through a user account from a Nonce list that corresponds to the user account and is maintained in a blockchain, where the Nonce list includes a plurality of Nonce records, and the Nonce record includes a version identifier of the Nonce list and a Nonce value; adding the obtained available Nonce record to the target transaction; and publishing the target transaction in the blockchain, so that when determining that a version identifier in the available Nonce record does not match the version identifier of the Nonce list maintained in the blockchain, a node device in the blockchain returns prompt information indicating that the target transaction is an invalid transaction to the client device; or when determining that a version identifier in the available Nonce record matches the version identifier of the Nonce list maintained in the blockchain, the node device in the blockchain further matches the available Nonce record with the Nonce record in the Nonce list to perform replay attack detection for the target transaction, and processes the target transaction when the replay attack detection for the target transaction succeeds.

Correspondingly, the present specification further provides an electronic device, including: a processor; and a memory, configured to store a machine executable instruction, where by reading and executing the machine-executable instruction that is stored in the memory and corresponds to blockchain-based transaction processing control logic, the processor is promoted to perform the following operations: receiving a target transaction that is initiated by a user through a user account and sent by a client device, where an available Nonce record obtained from a Nonce list that corresponds to the user account and is maintained in a blockchain is added to the target transaction, the Nonce list includes a plurality of Nonce records, and the Nonce record includes a version identifier of the Nonce list and a Nonce value; determining whether a version identifier in the available Nonce record matches the version identifier of the Nonce list that corresponds to the user account and is maintained in the blockchain; and if the version identifier in the available Nonce record does not match the version identifier of the Nonce list that corresponds to the user account and is maintained in the blockchain, returning prompt information indicating that the target transaction is an invalid transaction to the client device; or if the version identifier in the available Nonce record matches the version identifier of the Nonce list that corresponds to the user account and is maintained in the blockchain, further matching the available Nonce record with the Nonce record in the Nonce list to perform replay attack detection for the target transaction, and processing the target transaction when the replay attack detection for the target transaction succeeds.

In the previous embodiments, a transaction invalidation mechanism can be introduced while the replay attack is effectively alleviated, and a transaction that includes an old version identifier is invalidated in time after the version identifier of the Nonce list is updated. In addition, a transaction concurrency capability of an account can be improved while the replay attack is effectively alleviated.

DESCRIPTION OF EMBODIMENTS

A replay attack in the blockchain field refers to an attack behavior of publishing a repeated transaction, which causes the same transaction to be executed for a plurality of times, and causes a loss to a user.

For example, a classic "double spending" problem in a Bitcoin network is a typical replay attack. If a transfer transaction is intercepted by an unauthorized node after being approved by a signature of a user by using a private key, the unauthorized node can initiate a replay attack based on the intercepted transaction after the transaction is executed. The transaction is repeatedly published and executed in the blockchain. Consequently, the transfer transaction is executed for a plurality of times, causing a financial loss to the user.

In some shown implementations, usually a densely increasing Nonce value (a densely increasing integer) can be added to a transaction to cope with the replay attack risk to the transaction.

Figure 1:
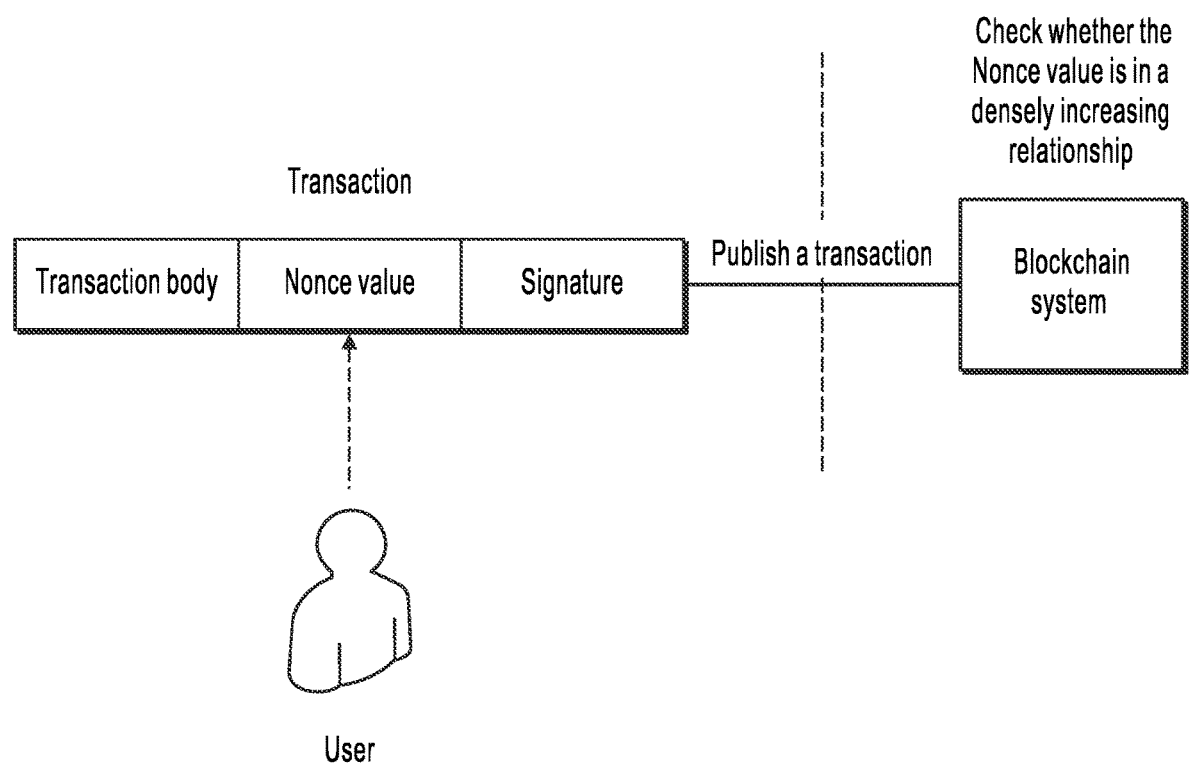
FIG. 1 is a schematic diagram illustrating performing replay attack detection for a transaction, according to an example embodiment.

FIG. 1 is a schematic diagram illustrating performing replay attack detection for a transaction, according to the present specification.

As shown in FIG. 1, a Nonce value can be specified for each transaction initiated by a user through a personal user account on a client device, and a signature can be added to a transaction body and the specified Nonce value of the transaction by using a private key held by the user. The signature is an overall signature of [transaction body, Nonce value]. As such, it can be ensured that the Nonce value of the transaction cannot be tampered with.

After the signature is added, the client device can publish the transaction in a blockchain. After receiving the transaction, a node device in the blockchain needs to verify whether the signature of the transaction is valid, and further needs to detect whether the Nonce value of the transaction is in a densely increasing relationship with a Nonce value of the latest transaction that has been successfully processed. If the Nonce value of the transaction is in a densely increasing relationship with the Nonce value of the latest transaction that has been successfully processed, the transaction can be processed. Otherwise, the transaction can be considered as an invalid transaction.

For example, assume that the user initiates a transaction with a Nonce value of 1 on the client device through the personal user account, namely, Account 1. After the transaction is successfully processed in the blockchain, when the user initiates a new transaction on the client device through Account 1, a Nonce value of the transaction needs to be specified as 2, so that the transaction can be considered as a valid transaction by the node device in the blockchain for processing.

Correspondingly, a blockchain system maintains a Nonce status of the user account of the user. Each time a transaction initiated through Account 1 is successfully processed, the blockchain system automatically increases the Nonce value corresponding to the user account by 1. After receiving a transaction published by the client device, the node device in the blockchain compares a Nonce value of the transaction with a Nonce value in the maintained Nonce status to determine whether the Nonce value of the transaction is exactly increased by 1 from a Nonce value of the latest transaction that has been successfully processed. If yes, the transaction can be processed.

As such, the replay attack risk to a transaction can be alleviated to some extent. However, for a user account, a next transaction can be initiated only after a current transaction is processed. Therefore, there is a shortfall in a transaction concurrency capability of a single account, and this method cannot be applied to a high-concurrency scenario.

Based on this, in the present specification, a replay attack protection solution that can be applied to a high concurrency scenario is provided.

In implementation, a Nonce list set can be maintained in a blockchain. The Nonce list set can include Nonce lists corresponding to several user accounts. The Nonce list can include a plurality of Nonce records. Each Nonce record includes a version identifier of the Nonce list and a Nonce value.

When a user initiates a target transaction through a personal user account on a client device, the client device can obtain an available Nonce record for the target transaction from the Nonce list, add the obtained available Nonce record to the target transaction, and then publish the target transaction in the blockchain.

After receiving the target transaction, a node device in the blockchain can first match a version identifier in the available Nonce record with a version identifier of a Nonce list that corresponds to the user account and is maintained in the blockchain. If the version identifier in the available Nonce record does not match the version identifier of the Nonce list that corresponds to the user account and is maintained in the blockchain, the node device can return prompt information indicating that the target transaction is an invalid transaction to the client device. If the version identifier in the available Nonce record matches the version identifier of the Nonce list that corresponds to the user account and is maintained in the blockchain, the node device can further match the available Nonce record included in the transaction with a Nonce record in the Nonce list that correspond to the user account and is maintained in the blockchain to perform replay attack detection for the target transaction.

If the available Nonce record included in the transaction matches any target Nonce record in the Nonce list that corresponds to the user account and is maintained in the blockchain, it can be determined that the replay attack detection for the transaction succeeds. In this case, the node device can process the target transaction for execution, and monotonically increase a Nonce value in the target Nonce record based on predetermined amplitude after successfully processing the target transaction. For example, the Nonce value in the target Nonce record can still be automatically increased by 1.

In the previous technical solution, before replay attack detection is performed for each transaction initiated by the user through the user account on the client device, a version identifier in a Nonce record used for the transaction is matched with the version identifier of the Nonce list that corresponds to the user account and is maintained in the blockchain to perform invalidation detection for the transaction. Therefore, a transaction invalidation mechanism can be introduced while the replay attack is effectively alleviated, and a transaction that includes an old version identifier is invalidated in time after the version identifier of the Nonce list is updated.

In addition, the Nonce list that corresponds to the user account and is maintained in the blockchain can include a plurality of available Nonce records, and therefore the user can initiate, through the user account on the client device, a plurality of valid transactions that include available Nonce records and for which replay attack detection in a blockchain system succeeds. As such, a transaction concurrency capability of the user account can be significantly improved.

The following describes the present specification by using specific embodiments and with reference to specific application scenarios.

Figure 2:
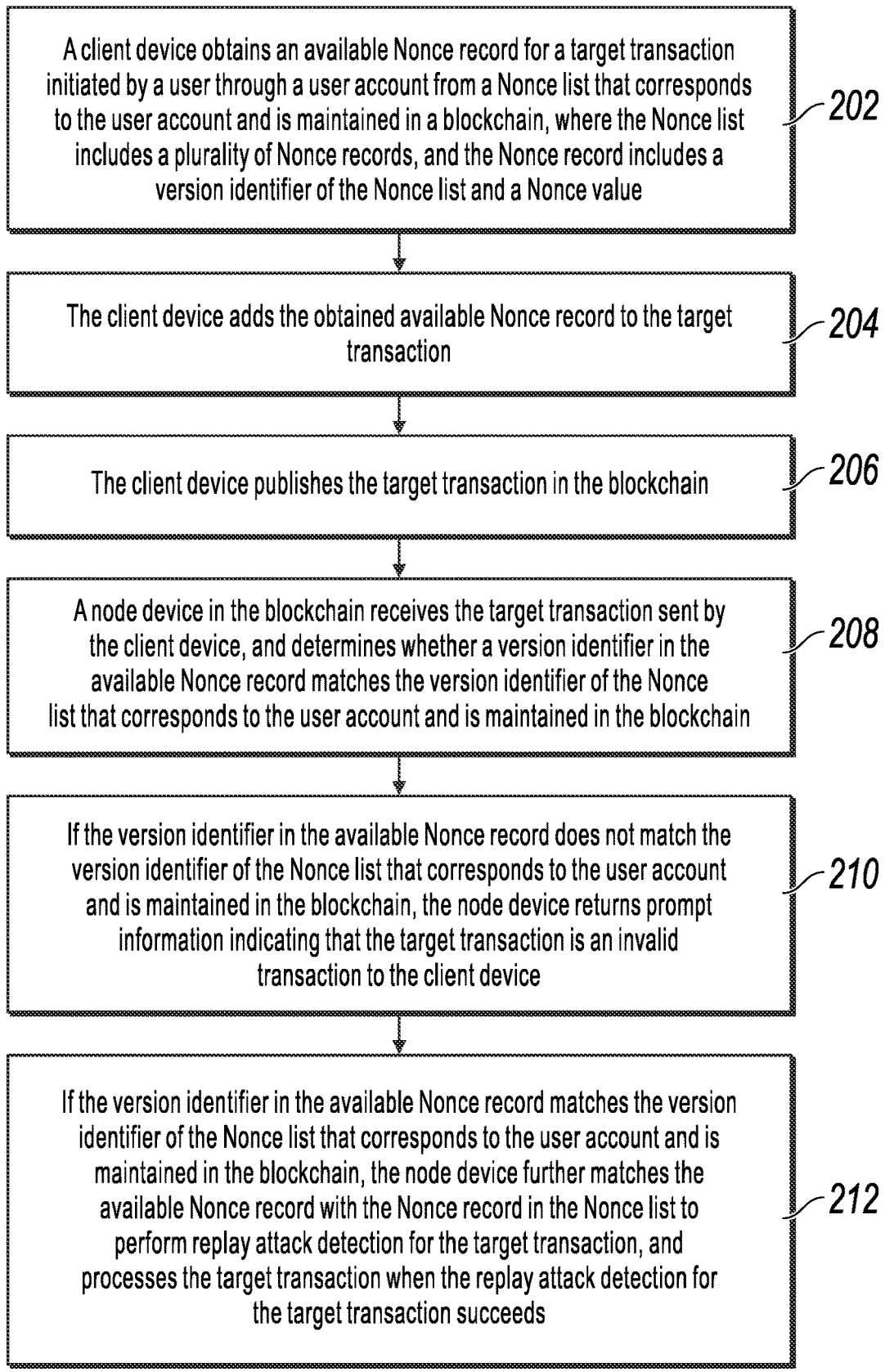
FIG. 2 is a flowchart illustrating a blockchain-based transaction processing method, according to an example embodiment.

FIG. 2 illustrates a blockchain-based transaction processing method, according to an embodiment of the present specification. The method includes the following steps.

Step 202: A client device obtains an available Nonce record for a target transaction initiated by a user through a user account from a Nonce list that corresponds to the user account and is maintained in a blockchain, where the Nonce list includes a plurality of Nonce records, and the Nonce record includes a version identifier of the Nonce list and a Nonce value.

Step 204: The client device adds the obtained available Nonce record to the target transaction.

Step 206: The client device publishes the target transaction in the blockchain.

Step 208: A node device in the blockchain receives the target transaction sent by the client device, and determines whether a version identifier in the available Nonce record matches the version identifier of the Nonce list that corresponds to the user account and is maintained in the blockchain.

Step 210: If the version identifier in the available Nonce record does not match the version identifier of the Nonce list that corresponds to the user account and is maintained in the blockchain, the node device returns prompt information indicating that the target transaction is an invalid transaction to the client device.

Step 212: If the version identifier in the available Nonce record matches the version identifier of the Nonce list that corresponds to the user account and is maintained in the blockchain, the node device further matches the available Nonce record with the Nonce record in the Nonce list to perform replay attack detection for the target transaction, and processes the target transaction when the replay attack detection for the target transaction succeeds.

The blockchain described in the present specification can specifically include a private blockchain, a public blockchain, a consortium blockchain, etc. Implementations are not specifically limited in the present specification.

For example, in a scenario, the blockchain can be specifically a consortium blockchain that includes, as member devices, a server of a third-party payment platform, a domestic bank server, an overseas bank server, and several user node devices. An operator of the consortium blockchain can deploy online services relied on the consortium blockchain, such as cross-border transfer and asset transfer based on the consortium blockchain.

It is worthwhile to note that a transaction described in the present specification refers to a piece of data that is created by a user by using a client device of the blockchain and needs to be eventually published in a distributed database of the blockchain.

Transactions in the blockchain are usually classified into a transaction in a narrow sense and a transaction in a broad sense. The transaction in a narrow sense refers to a value transfer published by a user in the blockchain. For example, in a conventional Bitcoin blockchain network, a transaction can be a transfer initiated by a user in the blockchain. The transaction in a broad sense refers to service data with a service intention published by a user in the blockchain. For example, the operator can build a consortium blockchain based on actual service needs, and deploy some other types of online services (for example, anti-counterfeiting verification services, house rental services, vehicle scheduling services, insurance claims services, credit services, and medical services) that are irrelevant to value transfer based on the consortium blockchain. In this type of consortium blockchain, a transaction can be a service message or a service request with a service intention published by a user in the consortium blockchain.

In the present specification, a Nonce list set can be maintained in the blockchain. The Nonce list set can include Nonce lists corresponding to several user accounts. Each of the Nonce lists can include a plurality of Nonce records. Each Nonce record can include an auxiliary parameter and a Nonce value.

That is, in the present specification, the Nonce record can be specifically a composite structure that includes a plurality of fields including the Nonce value.

In implementation, the operator of the blockchain can allocate an available Nonce value to each user account in advance, set a corresponding auxiliary field for each Nonce value based on the allocated available Nonce value, and then construct a plurality of Nonce records based on each available Nonce value and the corresponding auxiliary field.

Then, a Nonce list can be constructed for the user account based on the plurality of generated Nonce records. Finally, the Nonce list set can be created based on the Nonce list constructed for each user account, and the Nonce list set can be published in the blockchain. Consensus processing can be performed by the node device in the blockchain, and after a consensus is reached, the Nonce list set can be stored in a distributed database of the blockchain for storage and maintenance.

It is worthwhile to note that specific parameter content of the auxiliary parameters is not particularly limited in the present specification. In practice, the auxiliary parameter can specifically include any form of parameter obtained by the operator of the blockchain through extension based on the available Nonce value of the user account and actual needs, or a combination of parameters.

That is, in practice, a quantity and type of parameters that can be included in the auxiliary parameter may not be fixed. Any parameter can be obtained as the auxiliary parameter through extension based on the Nonce value. Alternatively, a plurality of parameters can be obtained through extension based on the Nonce value, and are combined as the auxiliary parameter.

In the present specification, the auxiliary parameter in the Nonce record in the Nonce list can specifically include the version identifier (for example, a version number) of the Nonce list. The version identifier is specifically used to indicate a current version of the Nonce list. The Nonce lists corresponding to the user accounts in the Nonce list set can correspond to the same version identifier or different version identifiers.

In practice, the version identifier of the Nonce list can be modified and updated by the operator of the blockchain when the Nonce list satisfies a specific version change condition. Alternatively, the version identifier of the Nonce list can be manually updated by the user by publishing a transaction in the blockchain by using the client device.

In practice, if the version identifier of the Nonce list is updated, a transaction (including the version identifier of the Nonce list before update) that has been published in the blockchain but has not been processed may be considered as an invalid because the included version identifier (the old version identifier before update) of the Nonce list does not match an updated version identifier of the Nonce list, and cannot be processed in the blockchain system.

As such, the operator of the blockchain or the user can set some transactions that have been published but have not been processed to an invalid state by updating the version identifier of the Nonce list. Therefore, some transactions that cannot be processed for a long time can be terminated in time.

In some shown implementations, in addition to the version identifier of the Nonce list, the auxiliary parameter in the Nonce record in the Nonce list can include an index identifier (for example, an index number) of the Nonce record. The index identifier is specifically used to indicate a rank and a location of the Nonce record in the Nonce list.

Figure 3:
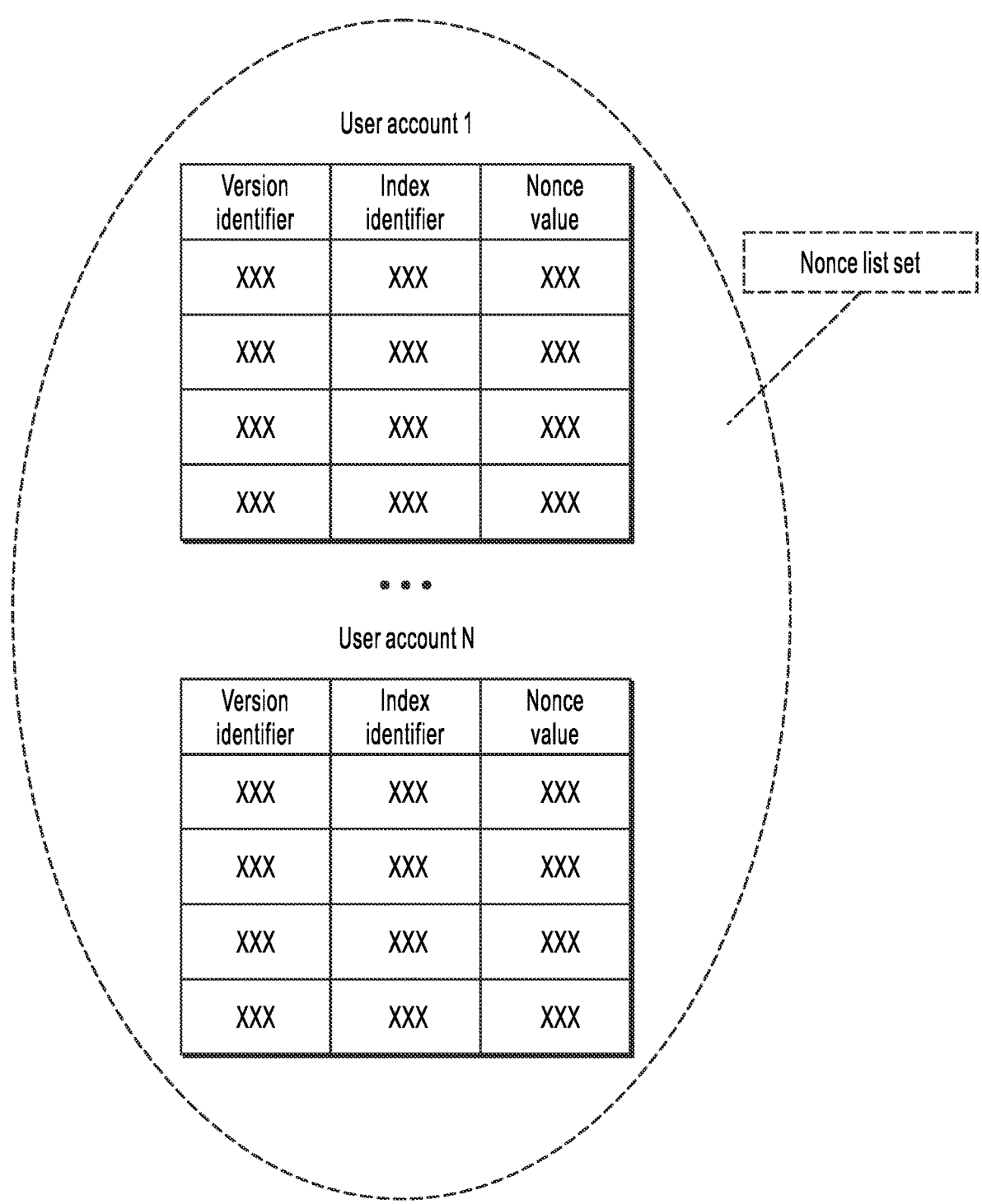
FIG. 3 is a schematic structural diagram of a Nonce list set maintained in a blockchain, according to an example embodiment.

For example, referring to FIG. 3, the auxiliary parameter in the Nonce record in the Nonce list includes both the version identifier of the Nonce list and the index identifier of the Nonce record. In this case, the Nonce record can be specifically a composite structure including fields such as a version (the version identifier), an index and a value (the Nonce value). In this case, the Nonce list set maintained in the blockchain can be represented in a form shown in FIG. 3.

Specific byte lengths of the Nonce record, the Nonce value and the auxiliary parameter in the Nonce record are not particularly limited in the present specification. In practice, the byte lengths can be flexibly set based on actual needs of the operator of the blockchain (for example, the operator can control specific value ranges of the Nonce value and the auxiliary parameter by using the occupied byte lengths).

For example, in some implementations, the Nonce record can be specifically a 16-byte composite structure. Four bytes represents the version (the version identifier), four bytes represents the index (the index identifier), and eight bytes represents the value (the Nonce value).

A plurality of parameters are obtained through extension based on the Nonce value, and are combined as the auxiliary parameter, so that the Nonce record in the Nonce table can cover various value fields, to reduce the probability that the plurality of Nonce records in the Nonce list conflict with each other due to the same value.

For example, the probability that two 12-byte Nonce records that include the version (the group identifier) and the value (the Nonce value) are identical and conflict with each other is far lower than the probability that two 16-byte Nonce records that include the version (the version identifier), the index (the index identifier), and the value (the Nonce value) are identical and conflict with each other.

In the present specification, the client device can be specifically a multi-threaded client device. That is, the client device can simultaneously enable a plurality of threads, and each thread can run independently. As such, the user can simultaneously initiate a plurality of transactions through the personal user account by invoking the plurality of threads of the client device.

Figures 4, 5:
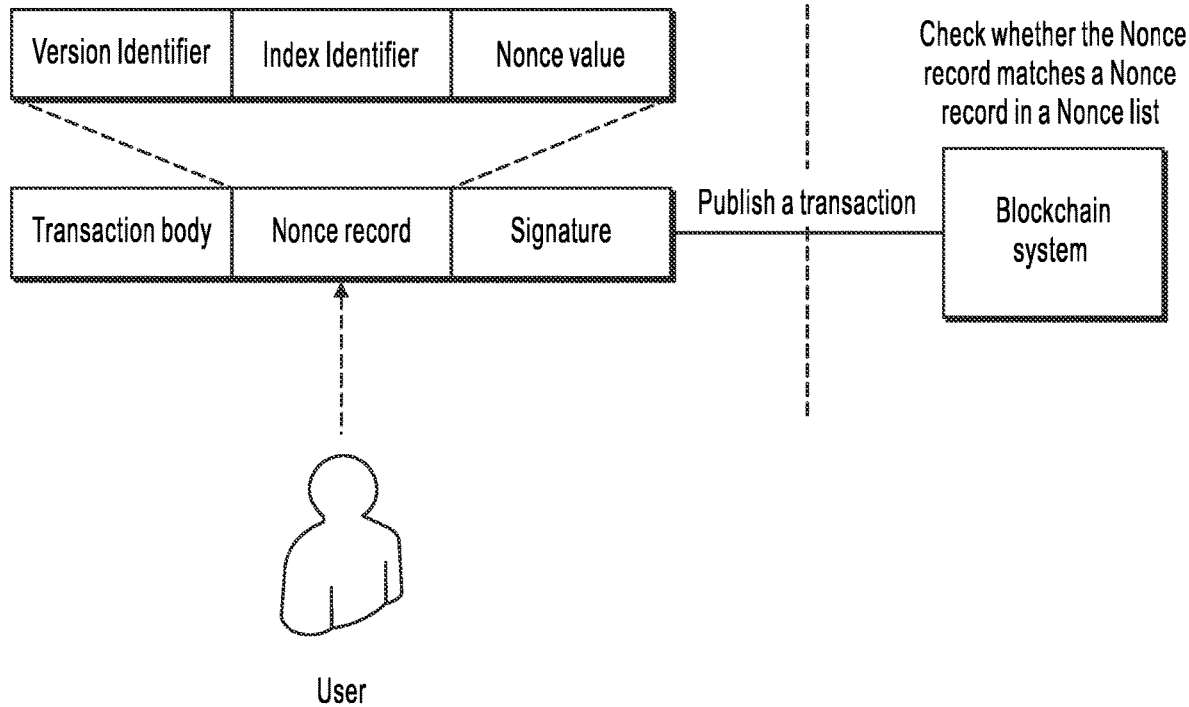
FIG. 4 is another schematic diagram illustrating performing replay attack detection for a transaction, according to an example embodiment.
FIG. 5 is a schematic structural diagram of a Nonce list maintained in a client device, according to an example embodiment.

Referring to FIG. 4, after the user initiates a target transaction on the client device through the personal user account by invoking the thread enabled by the client device, the thread can obtain an available Nonce record for the target transaction from the Nonce list that corresponds to the user account and is maintained in the blockchain.

The Nonce list includes a plurality of Nonce records, and therefore the plurality of threads enabled by the client device can obtain available Nonce records for initiated transactions from the Nonce list. As such, the user can simultaneously initiate a plurality of transactions through the personal user account on the client device. Therefore, in the present specification, a quantity of Nonce records in the Nonce list can be actually used to indicate a transaction concurrency capability of the personal user account of the user. For example, if the Nonce list includes four Nonce records, the user can simultaneously initiate four transactions through the user account.

Based on this, in practice, the operator of the blockchain can flexibly specify the quantity of Nonce records included in the Nonce list based on performance of the client device. Alternatively, the client device can actively report performance of the client device to the blockchain system, and the operator of the blockchain can flexibly specify the quantity of Nonce records included in the Nonce list.

For example, if it is determined, based on the performance of the client device, that the client device can simultaneously enable four threads to initiate transactions, four available Nonce records can be added to the Nonce list when the Nonce list is created for the user account logged in to the client device.

In some shown implementations, in an initialization phase, the client device can "download" the Nonce list maintained in the blockchain in advance for local maintenance.

For example, in implementation, when the client device is started for running, or when the client device is disconnected from the node device in the blockchain, and needs to be reconnected to the node device, an initialization operation is needed. In this case, when receiving an initialization instruction (for example, a start instruction or a reconnection instruction) for the client device that is triggered by the user, the client device can establish a connection to the node device in the blockchain in response to the initialization instruction, access the distributed database of the blockchain based on the connection, obtain the Nonce list maintained in the blockchain, and then locally store and maintain the obtained Nonce list.

In this case, when needing to obtain the available Nonce record for the target transaction, the thread enabled on the client device can directly obtain the available Nonce record from the locally maintained Nonce list.

In this way, no data exchange needs to be performed with the node device in the blockchain, and data is read from the Nonce list maintained in the blockchain to obtain the available Nonce record for the target transaction. As such, processing performance of the client device can be improved.

In some shown implementations, for the Nonce list locally maintained on the client device, a mark indicating "available" can be added by default by the client device to the Nonce record in the Nonce list.

For example, referring to FIG. 5, the Nonce record is the 16-byte composite structure shown in FIG. 4, and a 1-byte available field can be obtained through extension for the Nonce record in the Nonce list. When a value of the available field is T, it indicates that the Nonce record is "available". When the value of the available field is F, it indicates that the Nonce record is "unavailable".

When the thread enabled on the client device obtains the available Nonce record for the target transaction initiated by the user from the Nonce list locally maintained on the client device, a Nonce record can be randomly selected as the available Nonce record from all Nonce records that are marked as "available" in the Nonce list.

In addition, after the thread enabled on the client device obtains the available Nonce record for the target transaction initiated by the user from the Nonce list locally maintained on the client device, a mark included in the available Nonce record can be modified and updated, and a new mark indicating "unavailable" can be added to the available Nonce record, to mark the available Nonce record as unavailable.

In the present specification, after the thread enabled on the client device obtains the available Nonce record for the target transaction, the obtained available Nonce record can be added to the target transaction.

For example, referring back to FIG. 4, after obtaining the available Nonce record for the target transaction, the client device can package a transaction body of the target transaction and the available Nonce record, and then prompt the user to add an overall signature to the packaged [transaction body, Nonce record] based on a held private key. As such, it can be ensured that the Nonce record in the transaction cannot be tampered with.

Further, after the thread enabled on the client device adds the obtained available Nonce record to the target transaction, the client device can publish the target transaction in the blockchain.

For example, the client device publishes the target transaction to the node device accessed by the client device, or publishes the target transaction in the blockchain through broadcasting. A specific way of publishing the target transaction in the blockchain by the client device usually depends on a consensus mechanism used in the blockchain. Implementations are not particularly limited in the present specification.

After receiving the target transaction published by the client device, the node device in the blockchain can first initiate consensus processing for the target transaction based on a consensus algorithm used in the blockchain.

The consensus algorithm used in the blockchain and a consensus processing process for the target transaction based on the consensus algorithm are not described in detail in the present specification. A person skilled in the art can refer to description of related technologies when implementing the technical solutions described in the present specification.

After a consensus on the target transaction is reached, the node device in the blockchain can further initiate validity detection for the target transaction.

In the present specification, the validity detection for the target transaction can include at least validity detection for the signature included in the target transaction, validity detection for the target transaction, and replay attack detection for the target transaction.

In implementation, the node device in the blockchain can first verify the signature of the target transaction based on a public key corresponding to the private key held by the user. If verification on the signature of the target transaction fails, the target transaction can be considered as an invalid transaction, and the node device can directly return, to the user through the client device, a prompt message indicating a transaction execution failure.

If verification on the signature of the target transaction succeeds, the node device can match the version identifier in the available Nonce record included in the target transaction with the version identifier of the Nonce list that corresponds to the personal user account of the user and is maintained in the blockchain, to determine whether the version identifier of the Nonce list that is included in the target transaction is the same as the version identifier of the Nonce list that corresponds to the personal user account of the user and is maintained in the blockchain.

If the version identifier in the available Nonce record included in the target transaction does not match the version identifier of the Nonce list that corresponds to the personal user account of the user and is maintained in the blockchain, it indicates that the current version identifier of the Nonce list that corresponds to the personal user account of the user and is maintained in the blockchain may be updated. In this case, the node device can consider the target transaction as an invalid transaction, and return prompt information indicating that the target transaction is an invalid transaction to the client device.

If the version identifier in the available Nonce record included in the target transaction matches the version identifier of the Nonce list that corresponds to the personal user account of the user and is maintained in the blockchain, the node device can consider the target transaction as a valid transaction, and can further perform replay attack detection for the target transaction based on the available Nonce record included in the target transaction and the Nonce list that corresponds to the personal user account of the user and is maintained in the blockchain.

Referring back to FIG. 4, the node device can match the Nonce record included in the target transaction with each Nonce record in the Nonce list that corresponds to the user account and is maintained in the blockchain. If the Nonce record included in the target transaction matches any target Nonce record in the Nonce list, it can be determined that the replay attack detection for the target transaction succeeds. In this case, the node device can process the target transaction.

In addition, after processing the target transaction, the node device can monotonically increase a Nonce value in the target Nonce record based on predetermined amplitude. The predetermined amplitude can be customized based on actual needs.

For example, the predetermined amplitude can still be 1, and the node device can automatically increase the Nonce value in the matched target Nonce record in the Nonce list by 1 after processing the target transaction.

In this way, if the target transaction is repeatedly published in the blockchain after being processed, no corresponding Nonce record can be matched for the repeatedly published target transaction from the Nonce list in a replay attack detection phase because the Nonce value in the target Nonce record that matches the available Nonce record included in the target transaction in the Nonce list has been updated. Therefore, the repeatedly published target transaction will not be processed again. As such, a replay attack initiated by repeatedly publishing the target transaction in the blockchain can be effectively alleviated.

In some shown implementations, after the target transaction is processed, a notification message indicating that the target transaction is processed can be returned to the client device. After publishing the target transaction in the blockchain, the client device can determine whether the notification message indicating that the target transaction is processed is received from the node device.

If the client device determines that the notification message indicating that the target transaction is processed is received, the client device can monotonically increase, based on the predetermined amplitude, a Nonce value in the available Nonce record obtained for the target transaction from the Nonce list locally maintained on the client device. For example, the client device automatically increases the Nonce value in the available Nonce record by 1 to maintain content synchronization with the Nonce list maintained in the blockchain.

In addition, the available Nonce record has previously been marked as "unavailable", and therefore after monotonically increasing the Nonce value in the available Nonce record based on the predetermined amplitude, the client device can set the value of the available field in the available Nonce record to "T".

In the previous technical solution, before replay attack detection is performed for each transaction initiated by the user through the user account on the client device, a version identifier in a Nonce record used for the transaction is matched with the version identifier of the Nonce list that corresponds to the user account and is maintained in the blockchain to perform invalidation detection for the transaction. Therefore, a transaction invalidation mechanism can be introduced while the replay attack is effectively alleviated, and a transaction that includes an old version identifier is invalidated in time after the version identifier of the Nonce list is updated.

In addition, the Nonce list that corresponds to the user account and is maintained in the blockchain can include a plurality of available Nonce records, and therefore the user can initiate, through the user account on the client device, a plurality of valid transactions that include available Nonce records and for which replay attack detection in a blockchain system succeeds. As such, a transaction concurrency capability of the user account can be significantly improved.

Figure 6:
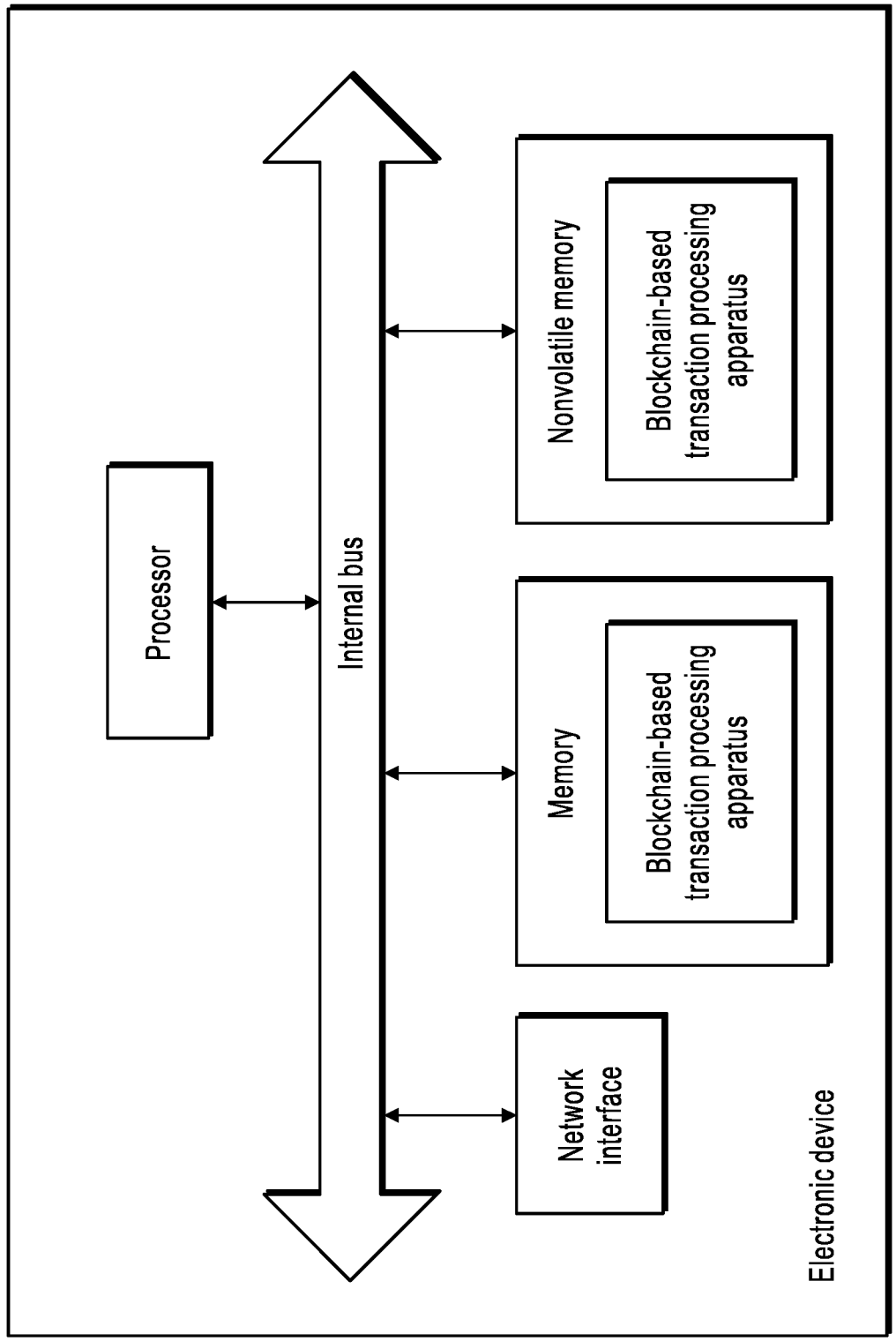
FIG. 6 is a schematic structural diagram of an electronic device, according to an example embodiment.

Corresponding to the previous method embodiments, the present specification further provides embodiments of a blockchain-based transaction processing apparatus. The embodiments of the blockchain-based transaction processing apparatus in the present specification can be applied to an electronic device. The apparatus embodiments can be implemented by software, or can be implemented by hardware or a combination of software and hardware. Software implementation is used as an example. As a logical apparatus, the apparatus is formed by reading a corresponding computer program instruction from a nonvolatile memory by a processor of the electronic device in which the apparatus is located and running the instruction in a memory. In terms of hardware, FIG. 6 is a diagram illustrating a hardware structure of the electronic device in which the blockchain-based transaction processing apparatus is located. In addition to a processor, a memory, a network interface, and a nonvolatile memory shown in FIG. 6, the electronic device in which the apparatus is located in the present embodiment usually can include other hardware based on an actual function of the electronic device. Details are omitted here for simplicity.

Figure 7:
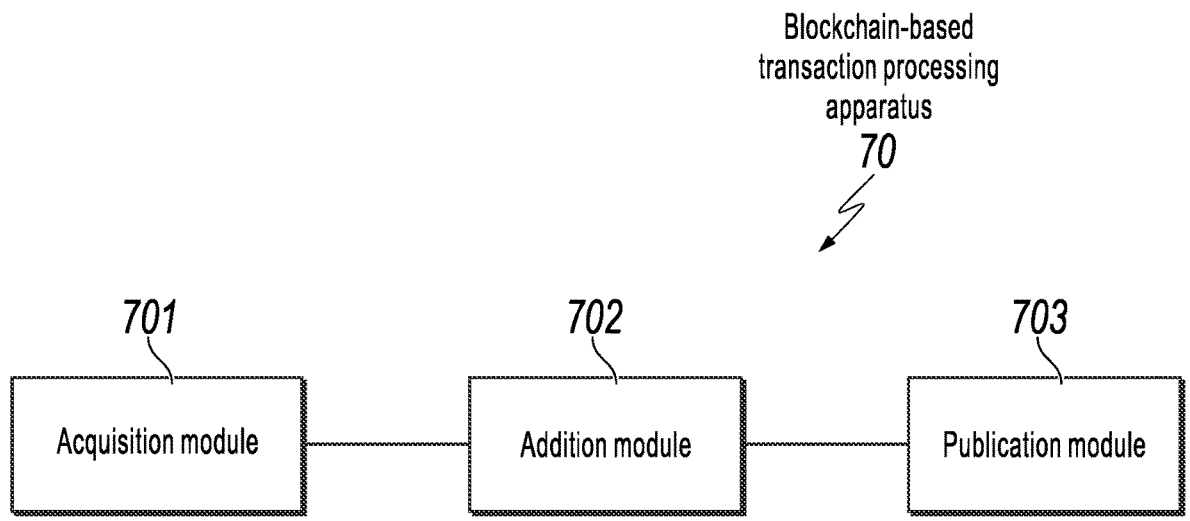
FIG. 7 is a block diagram illustrating a blockchain-based transaction processing apparatus, according to an example embodiment.

FIG. 7 is a block diagram illustrating a blockchain-based transaction processing apparatus, according to an example embodiment of the present specification.

Referring to FIG. 7, the blockchain-based transaction processing apparatus 70 can be applied to the electronic device shown in FIG. 6, and includes an acquisition module 701, an addition module 702, and a publication module 703.

The acquisition module 701 is configured to obtain an available Nonce record for a target transaction initiated by a user through a user account from a Nonce list that corresponds to the user account and is maintained in a blockchain. The Nonce list includes a plurality of Nonce records, and the Nonce record includes an auxiliary parameter and a Nonce value.

The addition module 702 is configured to add the obtained available Nonce record to the target transaction.

The publication module 703 is configured to publish the target transaction in the blockchain, so that when determining that a version identifier in the available Nonce record does not match a version identifier of the Nonce list maintained in the blockchain, anode device in the blockchain returns prompt information indicating that the target transaction is an invalid transaction to a client device; or when determining that a version identifier in the available Nonce record matches a version identifier of the Nonce list maintained in the blockchain, the node device in the blockchain further matches the available Nonce record with the Nonce record in the Nonce list to perform replay attack detection for the target transaction, and processes the target transaction when the replay attack detection for the target transaction succeeds.

In some embodiments, the acquisition module 701 is further configured to before obtaining the available Nonce record for the target transaction initiated by the user through the user account from the Nonce list, in response to an initialization instruction for the client device, obtain the Nonce list maintained in the blockchain, and locally maintain the obtained Nonce list on the client device.

In some embodiments, the acquisition module 701 is configured to obtain the available Nonce record for the target transaction initiated by the user through the user account from the Nonce list locally maintained on the client device.

In some embodiments, the Nonce record in the Nonce list locally maintained on the client device is marked as available by default; and the acquisition module 701 is further configured to mark the available Nonce record as unavailable in the Nonce list after obtaining the available Nonce record for the target transaction from the Nonce list locally maintained on the client device.

In some embodiments, the acquisition module 701 is further configured to determine whether a notification message indicating that the target transaction is processed is received from the node device; and if yes, monotonically increase a Nonce value in the available Nonce record based on predetermined amplitude, and re-mark the available Nonce record as available in the Nonce list after monotonically increasing the Nonce value.

In some embodiments, the client device is a multi-threaded client device, and a quantity of Nonce records in the Nonce list indicates a transaction concurrency capability of the user account.

In some embodiments, the Nonce record further includes an index identifier of the Nonce record.

Figure 8:
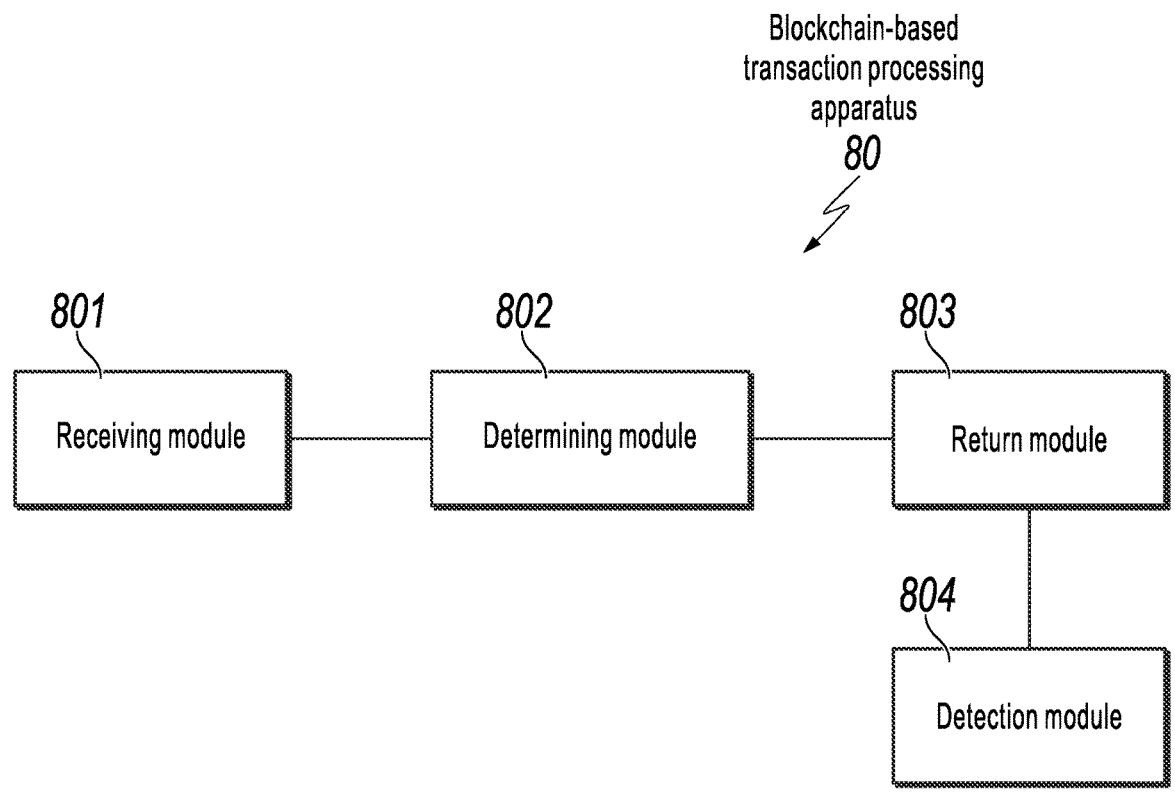
FIG. 8 is another block diagram illustrating a blockchain-based transaction processing apparatus, according to an example embodiment.

FIG. 8 is another block diagram illustrating a blockchain-based transaction processing apparatus, according to an example embodiment of the present specification.

Referring to FIG. 8, the blockchain-based transaction processing apparatus 80 can also be applied to the electronic device shown in FIG. 6, and includes a receiving module 801, a determining module 802, a return module 803, and a detection module 804.

The receiving module 801 is configured to receive a target transaction that is initiated by a user through a user account and sent by a client device. An available Nonce record obtained from a Nonce list that corresponds to the user account and is maintained in a blockchain is added to the target transaction, the Nonce list includes a plurality of Nonce records, and the Nonce record includes a version identifier of the Nonce list and a Nonce value.

The determining module 802 is configured to determine whether a version identifier in the available Nonce record matches the version identifier of the Nonce list that corresponds to the user account and is maintained in the blockchain.

The return module 803 is configured to: if the version identifier in the available Nonce record does not match the version identifier of the Nonce list that corresponds to the user account and is maintained in the blockchain, return prompt information indicating that the target transaction is an invalid transaction to the client device.

The detection module 804 is configured to: if the version identifier in the available Nonce record matches the version identifier of the Nonce list that corresponds to the user account and is maintained in the blockchain, further match the available Nonce record with the Nonce record in the Nonce list to perform replay attack detection for the target transaction, and process the target transaction when the replay attack detection for the target transaction succeeds.

In some embodiments, the detection module 804 is further configured to match the available Nonce record with the Nonce record in the Nonce list that corresponds to the user account and is maintained in the blockchain; and if the available Nonce record matches any target Nonce record in the Nonce list, determine that the replay attack detection for the target transaction succeeds.

In some embodiments, the detection module 804 is further configured to if the available Nonce record matches the any target Nonce record in the Nonce list, monotonically increase a Nonce value in the target Nonce record based on predetermined amplitude; and return a notification message indicating that the target transaction is processed to the client device.

In some embodiments, the Nonce record further includes an index identifier of the Nonce record.

For specific implementation processes of functions of the modules in the apparatus, references can be made to the implementation processes of the corresponding steps in the method. Details are omitted here for simplicity.

The apparatus embodiments basically correspond to the method embodiments. Therefore, for related parts, references can be made to partial description in the method embodiments. The previously described apparatus embodiments are merely examples. The modules described as separate parts can be or do not have to be physically separate, and parts displayed as modules can be or do not have to be physical modules, can be located in one place, or can be distributed on a plurality of network modules. Some or all of these modules can be selected based on actual needs to achieve the objective of the technical solutions of the present specification. A person of ordinary skill in the art can understand and implement the present specification without creative efforts.

The system, apparatus, or module illustrated in the previously described embodiments can be specifically implemented by a computer chip or an entity, or can be implemented by a product having a certain function. A typical implementation device is a computer. Specific forms of the computer can include a personal computer, a laptop computer, a cellular phone, a camera phone, a smartphone, a personal digital assistant, a media player, a navigation device, an e-mail transceiver, a game console, a tablet computer, a wearable device, or any combination of several of these devices.

Corresponding to the previously described method embodiment, the present specification further provides an embodiment of an electronic device. The electronic device includes a processor and a memory, configured to store a machine-executable instruction. The processor and the memory are usually connected to each other by using an internal bus. In other possible implementations, the device can further include an external interface to enable the device to communicate with other devices or parts.

In the present embodiment, by reading and executing the machine-executable instruction that is stored in the memory and corresponds to the blockchain-based transaction processing control logic, the processor is promoted to perform the following operations: obtaining an available Nonce record for a target transaction initiated by a user through a user account from a Nonce list that corresponds to the user account and is maintained in a blockchain, where the Nonce list includes a plurality of Nonce records, and the Nonce record includes a version identifier of the Nonce list and a Nonce value; adding the obtained available Nonce record to the target transaction; and publishing the target transaction in the blockchain, so that when determining that a version identifier in the available Nonce record does not match the version identifier of the Nonce list maintained in the blockchain, a node device in the blockchain returns prompt information indicating that the target transaction is an invalid transaction to a client device; or when determining that a version identifier in the available Nonce record matches the version identifier of the Nonce list maintained in the blockchain, the node device in the blockchain further matches the available Nonce record with the Nonce record in the Nonce list to perform replay attack detection for the target transaction, and processes the target transaction when the replay attack detection for the target transaction succeeds.

In some embodiments, by reading and executing the machine-executable instruction that is stored in the memory and corresponds to the blockchain-based transaction processing control logic, the processor is promoted to perform the following operations: before obtaining the available Nonce record for the target transaction initiated by the user through the user account from the Nonce list, in response to an initialization instruction for the client device, obtaining the Nonce list maintained in the blockchain, and locally maintaining the obtained Nonce list on the client device.

In some embodiments, by reading and executing the machine-executable instruction that is stored in the memory and corresponds to the blockchain-based transaction processing control logic, the processor is promoted to perform the following operations: obtaining the available Nonce record for the target transaction initiated by the user through the user account from the Nonce list locally maintained on the client device.

In some embodiments, the Nonce record in the Nonce list locally maintained on the client device is marked as available by default; and by reading and executing the machine-executable instruction that is stored in the memory and corresponds to the blockchain-based transaction processing control logic, the processor is promoted to perform the following operations: marking the available Nonce record as unavailable in the Nonce list after obtaining the available Nonce record for the target transaction from the Nonce list locally maintained on the client device.

In some embodiments, by reading and executing the machine-executable instruction that is stored in the memory and corresponds to the blockchain-based transaction processing control logic, the processor is promoted to perform the following operations: determining whether a notification message indicating that the target transaction is processed is received from the node device; and if yes, monotonically increasing a Nonce value in the available Nonce record based on predetermined amplitude, and re-marking the available Nonce record as available in the Nonce list after monotonically increasing the Nonce value.

Corresponding to the method embodiments, the present specification further provides another embodiment of an electronic device. The electronic device includes a processor and a memory, configured to store a machine-executable instruction. The processor and the memory are usually connected to each other by using an internal bus. In other possible implementations, the device can further include an external interface to enable the device to communicate with other devices or parts.

In some embodiments, by reading and executing the machine-executable instruction that is stored in the memory and corresponds to blockchain-based transaction processing control logic, the processor is promoted to perform the following operations: receiving a target transaction that is initiated by a user through a user account and sent by a client device, where an available Nonce record obtained from a Nonce list that corresponds to the user account and is maintained in a blockchain is added to the target transaction, the Nonce list includes a plurality of Nonce records, and the Nonce record includes a version identifier of the Nonce list and a Nonce value; determining whether a version identifier in the available Nonce record matches the version identifier of the Nonce list that corresponds to the user account and is maintained in the blockchain; and if the version identifier in the available Nonce record does not match the version identifier of the Nonce list that corresponds to the user account and is maintained in the blockchain, returning prompt information indicating that the target transaction is an invalid transaction to the client device; or if the version identifier in the available Nonce record matches the version identifier of the Nonce list that corresponds to the user account and is maintained in the blockchain, further matching the available Nonce record with the Nonce record in the Nonce list to perform replay attack detection for the target transaction, and processing the target transaction when the replay attack detection for the target transaction succeeds.

In some embodiments, by reading and executing the machine-executable instruction that is stored in the memory and corresponds to the blockchain-based transaction processing control logic, the processor is promoted to perform the following operations: matching the available Nonce record with the Nonce record in the Nonce list that corresponds to the user account and is maintained in the blockchain; and if the available Nonce record matches any target Nonce record in the Nonce list, determining that the replay attack detection for the target transaction succeeds.

In some embodiments, by reading and executing the machine-executable instruction that is stored in the memory and corresponds to the blockchain-based transaction processing control logic, the processor is promoted to perform the following operations: if the available Nonce record matches the any target Nonce record in the Nonce list, monotonically increasing a Nonce value in the target Nonce record based on predetermined amplitude; and returning a notification message indicating that the target transaction is processed to the client device.

A person skilled in the art can easily figure out another implementation solution of the present specification after considering the specification and practicing the present invention disclosed here. The present specification is intended to cover any variations, uses, or adaptive changes of the present specification. These variations, uses, or adaptive changes follow general principles of the present specification, and include common knowledge or a commonly used technical means that are not disclosed in the technical field of the present specification. The present specification and the embodiments are merely considered as examples, and the actual scope and spirit of the present specification are pointed out by the following claims.

It should be understood that the present specification is not limited to the precise structures that have been described above and shown in the accompanying drawings, and various modifications and changes can be made without departing from the scope of the present specification. The scope of the present specification is limited only by the appended claims.

The previous descriptions are merely preferred embodiments of the present specification, and are not intended to limit the present specification. Any modification, equivalent replacement, or improvement made without departing from the spirit and principle of the present specification shall fall within the protection scope of the present specification.

What is claimed is:

1. A computer-implemented method, comprising:
   for each target transaction of a plurality of target transactions:
     obtaining, at a first device, from a first Nonce list, an available Nonce record for the target transaction initiated by a user through a user account, wherein the first Nonce list comprises a plurality of Nonce records, and each Nonce record of the plurality of Nonce records comprises a version identifier of the first Nonce list and a Nonce value, and wherein the Nonce value is different for each target transaction;
     adding, by the first device, the available Nonce record to the target transaction;
     publishing, by the first device, the target transaction in a blockchain;
   determining, by a node device in the blockchain that is separate from the first device, that at least one available Nonce record has a version identifier that does not match the version identifier of a second Nonce list maintained in the blockchain, and also determining that at least one available Nonce record has a version identifier that does match the version identifier of the second Nonce list maintained in the blockchain;
   for each available Nonce record that has a version identifier that the node device determines does not match the version identifier of the second Nonce list maintained in the blockchain, generating, by the node device, prompt information indicating that the target transaction is an invalid transaction when the node device determines that a version identifier in the available Nonce record does not match the version identifier of the second Nonce list maintained in the blockchain;
   for each available Nonce record that has a version identifier that the node device determines does match the version identifier of the second Nonce list maintained in the blockchain:
     performing, by the node device, a replay attack detection for the target transaction by matching the available Nonce record with at least one of the plurality of Nonce records in the second Nonce list; and
     upon a successfully replay attack detection, generating, by the node device, a notification message indicating that the target transaction is processed when the node device determines that the version identifier in the available Nonce record matches the version identifier of the second Nonce list maintained in the blockchain and successfully performs the replay attack detection by matching the available Nonce record with at least one of the plurality of Nonce records in the second Nonce list;
   receiving, at the first device and from the node device in the blockchain, for each available Nonce record that has a version identifier that does not match the version identifier of the second Nonce list maintained in the blockchain, the prompt information indicating that the target transaction is an invalid transaction; and
   receiving, at the first device and from the node device in the blockchain, for each available Nonce record that has a version identifier that does match the version identifier of the second Nonce list maintained in the blockchain, the notification message indicating that the target transaction is processed.

2. The computer-implemented method according to claim 1, further comprising:
   in response to an initialization instruction for a client device, obtaining the second Nonce list maintained in the blockchain, and locally maintaining the second Nonce list on the client device before obtaining the available Nonce record for the target transaction initiated by the user through the user account from the first Nonce list.

3. The computer-implemented method according to claim 2, wherein obtaining the available Nonce record for the target transaction initiated by the user through the user account from the first Nonce list comprises:
   obtaining the available Nonce record for the target transaction initiated by the user through the user account from the second Nonce list locally maintained on the client device.

4. The computer-implemented method according to claim 3, wherein the plurality of Nonce records in the second Nonce list locally maintained on the client device is marked as available by default; and the method further comprises:
   marking the available Nonce record as unavailable in the first Nonce list after obtaining the available Nonce record for the target transaction from the second Nonce list locally maintained on the client device.

5. The computer-implemented method according to claim 4, further comprising:
   determining whether the notification message indicating that the target transaction is processed is received; and
   in response to determining the notification message indicating that the target transaction is received, monotonically increasing a Nonce value in the available Nonce record based on a predetermined amplitude, and re-marking the available Nonce record as available in the first Nonce list after monotonically increasing the Nonce value in the available Nonce record.

6. The computer-implemented method according to claim 1, wherein a quantity of the plurality of Nonce records in the first Nonce list indicates a transaction concurrency capability of the user account.

7. The computer-implemented method according to claim 1, wherein each Nonce record of the plurality the Nonce records further comprises an index identifier of the Nonce record.

8. A non-transitory, computer-readable medium storing one or more instructions executable by a computer system to perform operations comprising:
   for each target transaction of a plurality of target transactions:
     obtaining, at a first device, from a first Nonce list, an available Nonce record for the target transaction initiated by a user through a user account, wherein the first Nonce list comprises a plurality of Nonce records, and each Nonce record of the plurality of Nonce records comprises a version identifier of the first Nonce list and a Nonce value, and wherein the Nonce value is different for each target transaction;
adding, by the first device, the available Nonce record to the target transaction;
publishing, by the first device, the target transaction in a blockchain;
determining, by a node device in the blockchain that is separate from the first device, that at least one available Nonce record has a version identifier that does not match the version identifier of a second Nonce list maintained in the blockchain, and also determining that at least one available Nonce record has a version identifier that does match the version identifier of the second Nonce list maintained in the blockchain;
for each available Nonce record that has a version identifier that the node device determines does not match the version identifier of the second Nonce list maintained in the blockchain, generating, by the node device, prompt information indicating that the target transaction is an invalid transaction when the node device determines that a version identifier in the available Nonce record does not match the version identifier of the second Nonce list maintained in the blockchain;
for each available Nonce record that has a version identifier that the node device determines does match the version identifier of the second Nonce list maintained in the blockchain:
  performing, by the node device, a replay attack detection for the target transaction by matching the available Nonce record with at least one of the plurality of Nonce records in the second Nonce list; and
  upon a successfully replay attack detection, generating, by the node device, a notification message indicating that the target transaction is processed when the node device determines that the version identifier in the available Nonce record matches the version identifier of the second Nonce list maintained in the blockchain and successfully performs the replay attack detection by matching the available Nonce record with at least one of the plurality of Nonce records in the second Nonce list;
receiving, at the first device and from the node device in the blockchain, for each available Nonce record that has a version identifier that does not match the version identifier of the second Nonce list maintained in the blockchain, the prompt information indicating that the target transaction is an invalid transaction; and
receiving, at the first device and from the node device in the blockchain, for each available Nonce record that has a version identifier that does match the version identifier of the second Nonce list maintained in the blockchain, the notification message indicating that the target transaction is processed.

9. The non-transitory, computer-readable medium according to claim 8, wherein the operations further comprise:
in response to an initialization instruction for a client device, obtaining the second Nonce list maintained in the blockchain, and locally maintaining the second Nonce list on the client device before obtaining the available Nonce record for the target transaction initiated by the user through the user account from the first Nonce list.

10. The non-transitory, computer-readable medium according to claim 9, wherein the plurality of Nonce records in the second Nonce list locally maintained on the client device is marked as available by default; and the operations further comprise:
marking the available Nonce record as unavailable in the first Nonce list after obtaining the available Nonce record for the target transaction from the second Nonce list locally maintained on the client device.

11. The non-transitory, computer-readable medium according to claim 10, wherein the operations further comprise:
determining whether the notification message indicating that the target transaction is processed is received; and
in response to determining the notification message indicating that the target transaction is received, monotonically increasing a Nonce value in the available Nonce record based on a predetermined amplitude, and re-marking the available Nonce record as available in the first Nonce list after monotonically increasing the Nonce value in the available Nonce record.

12. The non-transitory, computer-readable medium according to claim 8, wherein a quantity of the plurality of Nonce records in the first Nonce list indicates a transaction concurrency capability of the user account.

13. A computer-implemented system, comprising:
a first device comprising one or more computers and one or more computer memory devices interoperably coupled with the one or more computers and having tangible, non-transitory, machine-readable media storing one or more instructions;
a node device comprising one or more computers and one or more computer memory devices interoperably coupled with the one or more computers and having tangible, non-transitory, machine-readable media storing one or more instructions;
wherein the instructions of the first device and the node device, when executed perform one or more operations comprising:
for each target transaction of a plurality of target transactions:
  obtaining, at a first device, from a first Nonce list, an available Nonce record for the target transaction initiated by a user through a user account, wherein the first Nonce list comprises a plurality of Nonce records, and each Nonce record of the plurality of Nonce records comprises a version identifier of the first Nonce list and a Nonce value, and wherein the Nonce value is different for each target transaction;
  adding, by the first device, the available Nonce record to the target transaction;
  publishing, by the first device, the target transaction in a blockchain;
  determining, by a node device in the blockchain that is separate from the first device, that at least one available Nonce record has a version identifier that does not match the version identifier of a second Nonce list maintained in the blockchain, and also determining that at least one available Nonce record has a version identifier that does match the version identifier of the second Nonce list maintained in the blockchain;
  for each available Nonce record that has a version identifier that the node device determines does not match the version identifier of the second Nonce list maintained in the blockchain, generating, by the node device, prompt information indicating that the target transaction is an invalid transaction when the node device determines that a version identifier in the available Nonce record does not match the version identifier of the second Nonce list maintained in the blockchain;

for each available Nonce record that has a version identifier that the node device determines does match the version identifier of the second Nonce list maintained in the blockchain:
- performing, by the node device, a replay attack detection for the target transaction by matching the available Nonce record with at least one of the plurality of Nonce records in the second Nonce list; and
- upon a successfully replay attack detection, generating, by the node device, a notification message indicating that the target transaction is processed when the node device determines that the version identifier in the available Nonce record matches the version identifier of the second Nonce list maintained in the blockchain and successfully performs the replay attack detection by matching the available Nonce record with at least one of the plurality of Nonce records in the second Nonce list;

receiving, at the first device and from the node device in the blockchain, for each available Nonce record that has a version identifier that does not match the version identifier of the second Nonce list maintained in the blockchain, the prompt information indicating that the target transaction is an invalid transaction; and receiving, at the first device and from the node device in the blockchain, for each available Nonce record that has a version identifier that does match the version identifier of the second Nonce list maintained in the blockchain, the notification message indicating that the target transaction is processed.

14. The computer-implemented system according to claim 13, wherein the operations further comprise:
in response to an initialization instruction for a client device, obtaining the second Nonce list maintained in the blockchain, and locally maintaining the second Nonce list on the client device before obtaining the available Nonce record for the target transaction initiated by the user through the user account from the first Nonce list.

15. The computer-implemented system according to claim 14, wherein the operations further comprise:
determining whether the notification message indicating that the target transaction is processed is received; and
in response to determining the notification message indicating that the target transaction is received, monotonically increasing a Nonce value in the available Nonce record based on a predetermined amplitude, and re-marking the available Nonce record as available in the first Nonce list after monotonically increasing the Nonce value in the available Nonce record.

16. The computer-implemented system according to claim 13, wherein a quantity of the plurality of Nonce records in the first Nonce list indicates a transaction concurrency capability of the user account.

\* \* \* \* \*